United States Patent
Harda et al.

(10) Patent No.: US 10,272,914 B2
(45) Date of Patent: Apr. 30, 2019

(54) VEHICLE CONTROL ARRANGEMENT, ROAD VEHICLE AND METHOD OF CONTROLLING A ROAD VEHICLE

(71) Applicant: VOLVO CAR CORPORATION, Gothenburg (SE)

(72) Inventors: Peter Harda, Torslanda (SE); Jonas Nilsson, Molndal (SE); Erik Coelingh, Alvangen (SE)

(73) Assignee: Volvo Car Corporation, Gothenburg (SE)

( * ) Notice: Subject to any disclaimer, the term of this patent is extended or adjusted under 35 U.S.C. 154(b) by 99 days.

(21) Appl. No.: 15/455,823

(22) Filed: Mar. 10, 2017

(65) Prior Publication Data

US 2017/0267248 A1 Sep. 21, 2017

(30) Foreign Application Priority Data

Mar. 18, 2016 (EP) .................................. 16161108

(51) Int. Cl.
*B60W 30/18* (2012.01)
*B60W 30/12* (2006.01)
(Continued)

(52) U.S. Cl.
CPC ...... *B60W 30/18145* (2013.01); *B60W 10/20* (2013.01); *B60W 30/12* (2013.01);
(Continued)

(58) Field of Classification Search
None
See application file for complete search history.

(56) References Cited

U.S. PATENT DOCUMENTS 8,909,428 B1* 12/2014 Lombrozo ........... B62D 15/025
701/41
9,096,262 B2* 8/2015 Urhahne .............. B62D 15/025
(Continued)

FOREIGN PATENT DOCUMENTS

DE 102008021150 8/2009
DE 102011013023 9/2012
DE 102013009422 12/2014

OTHER PUBLICATIONS

Extend European Search Report for EP 16161108.2, completed by the European Patent Office dated Oct. 10, 2016 All together 10 Pages.

*Primary Examiner* — Thomas G Black
*Assistant Examiner* — Demetra R Smith-Stewart
(74) *Attorney, Agent, or Firm* — Brooks Kushman P.C.

(57) ABSTRACT

A vehicle control arrangement is configured to control steering and velocity of a road vehicle including a velocity control arrangement, remote sensors configured to acquire vehicle surrounding information, a steering control unit configured to control steering of the vehicle based on the vehicle surrounding information, an upcoming road geometry detecting unit configured to detect presence of an upcoming curve section, a hands-on-wheel detecting unit configured to detect if presence exists of at least one hand on a steering wheel of the vehicle. The velocity control arrangement is configured to perform a reduction of velocity of the vehicle in case presence of an upcoming curve section is detected and no presence is detected of at least one hand on the steering wheel.

16 Claims, 2 Drawing Sheets

(51) Int. Cl.
*B60W 30/14* (2006.01)
*B60W 50/14* (2012.01)
*B60W 10/20* (2006.01)

(52) U.S. Cl.
CPC .......... *B60W 30/143* (2013.01); *B60W 50/14* (2013.01); *B60W 2420/403* (2013.01); *B60W 2420/42* (2013.01); *B60W 2420/52* (2013.01); *B60W 2420/54* (2013.01); *B60W 2420/62* (2013.01); *B60W 2510/20* (2013.01); *B60W 2520/10* (2013.01); *B60W 2540/00* (2013.01); *B60W 2540/18* (2013.01); *B60W 2550/146* (2013.01); *B60W 2550/402* (2013.01); *B60W 2710/20* (2013.01); *B60W 2720/10* (2013.01); *B60W 2720/24* (2013.01)

(56) References Cited

U.S. PATENT DOCUMENTS

| | | | |
|---|---|---|---|
| 9,446,792 B2* | 9/2016 | Takeda | B62D 6/008 |
| 9,604,649 B1* | 3/2017 | Pastor | B60W 40/09 |
| 2010/0152952 A1* | 6/2010 | Lee | B62D 1/286 |
| | | | 701/31.4 |
| 2010/0191421 A1* | 7/2010 | Nilsson | B62D 15/025 |
| | | | 701/41 |
| 2010/0228417 A1* | 9/2010 | Lee | B62D 15/025 |
| | | | 701/23 |
| 2011/0187862 A1* | 8/2011 | Ishikawa | H04N 7/18 |
| | | | 348/148 |
| 2016/0068103 A1 | 3/2016 | McNew et al. | |
| 2016/0132054 A1* | 5/2016 | Eigel | B60W 50/14 |
| | | | 701/23 |
| 2017/0235311 A1* | 8/2017 | Sekijima | B60W 10/06 |
| | | | 701/25 |

* cited by examiner

VEHICLE CONTROL ARRANGEMENT, ROAD VEHICLE AND METHOD OF CONTROLLING A ROAD VEHICLE

CROSS-REFERENCE TO RELATED APPLICATIONS

This application claims foreign priority benefits under 35 U.S.C. § 119(a)-(d) to European patent application number EP 16161108.2, filed Mar. 18, 2016, which is incorporated by reference in its entirety.

TECHNICAL FIELD

The present disclosure relates to a vehicle control arrangement configured to control steering and velocity of a road vehicle, a road vehicle and a method of controlling a road vehicle, using a vehicle control arrangement.

BACKGROUND

Different kinds of vehicle control arrangements configured to control velocity and/or steering of a vehicle have been developed. They can be divided into different categories based on the level of control of the vehicle hosting the control arrangement. In the United States, the National Highway Traffic Safety Administration (NHTSA) has proposed the following formal classification system:

Level 0: The driver completely controls the vehicle at all times.

Level 1: Individual vehicle controls are automated, such as electronic stability control or automatic braking.

Level 2: At least two controls can be automated in unison, such as adaptive cruise control in combination with lane keeping.

Level 3: The driver can fully cede control of all safety-critical functions in certain conditions. The vehicle senses when conditions require the driver to retake control and provides a "sufficiently comfortable transition time" for the driver to do so.

Level 4: The vehicle performs all safety-critical functions for the entire trip, with the driver not expected to control the vehicle at any time. As this vehicle would control all functions from start to stop, including all parking functions, it could include unoccupied cars.

An adaptive cruise control is a cruise control system for road vehicles that controls vehicle velocity and automatically adjusts the vehicle velocity to maintain a safe distance to preceding vehicles. A lane keeping system is a system controlling steering of a road vehicle to ensure the road vehicle stays in its lane. A vehicle comprising adaptive cruise control and a lane keeping system thus falls in the Level 2 category above. Vehicles falling in the categories Level 3 and Level 4 are under development.

All vehicles falling into categories 2-4 must be equipped some kind of remote sensors arranged to acquire vehicle surrounding information to allow control of steering and/or velocity on the basis of the acquired vehicle surrounding information. Such acquiring of vehicle surrounding information can be performed with good reliability in most situations by means of remote sensors such as RADAR (RAdio Detection And Ranging) sensors and/or LASER (Light Amplification by Stimulated Emission of Radiation) sensors, and/or LIDAR (LIght Detection And Ranging) sensors, and/or imaging sensors. Even though such acquiring of vehicle surrounding information can be performed with good reliability in most situations, it is a complex task to always acquire vehicle surrounding information in a correct manner due to the variation of road types, lane markings, weather conditions etc. If an error occurs in the control of steering of the road vehicle, whether based on erroneously acquired vehicle surrounding information or not, it may have severe consequences.

Therefore, there is room for an improved vehicle control arrangement providing an improved safety of travel of a road vehicle.

SUMMARY

An object of the present disclosure is to provide an improved safety of travel of a road vehicle.

According to an embodiment of the disclosure, the object is achieved by a vehicle control arrangement configured to control steering and velocity of a road vehicle, where the arrangement comprises a velocity control arrangement configured to control velocity of the road vehicle, remote sensors arranged to acquire vehicle surrounding information, a steering control unit operatively connected to a steering actuator of the road vehicle and being arranged to control steering of the road vehicle based on the vehicle surrounding information by controlling the steering actuator, an upcoming road geometry detecting unit arranged to detect presence of an upcoming curve section of a road on which the road vehicle is traveling, a hands-on-wheel detecting unit configured to detect if presence exists of at least one hand on a steering wheel of the road vehicle, wherein the velocity control arrangement further is configured to perform a reduction of velocity of the road vehicle in case presence of an upcoming curve section is detected and no presence is detected of at least one hand on the steering wheel.

Since the velocity control arrangement is configured to perform a reduction of velocity of the road vehicle in case presence of an upcoming curve section is detected and no presence is detected of at least one hand on the steering wheel, the velocity of the road vehicle will be reduced when arriving at, and traveling through, the curve section if no presence is detected of at least one hand on the steering wheel. As a result of the reduced travel velocity through the curve section unexpected faulty steering interventions by the steering control unit, or unexpected loss of automatic control of steering by the steering control unit, will have a reduced probability of causing an accident. This since an occupant of the road vehicle, or the vehicle control arrangement, will have more time available to regain control of the vehicle in case of such unexpected faulty steering interventions or unexpected loss of automatic steering. As a result, safety of travel is improved.

Further, a vehicle control arrangement is provided which provides an incentive for the occupant of the road vehicle to have at least one hand on the steering wheel, or to place at least one hand on the steering wheel, since otherwise the vehicle control arrangement will perform a reduction of velocity in cases where an upcoming curve section is detected. Also for this reason, safety of travel may be improved since when an occupant has at least one hand on the steering wheel, time needed to regain control of steering of the vehicle may be reduced case of unexpected faulty steering interventions or unexpected loss of automatic steering, as compared to situations where no hand is on the steering wheel.

Still further, since the velocity control arrangement is configured to perform a reduction of velocity of the road vehicle in case presence of an upcoming curve section is detected and no presence is detected of at least one hand on the steering wheel, the reducing of the velocity will notify occupants of the road vehicle about the presence of the upcoming curve section. Also for this reason, safety of travel is improved since when an occupant is aware of the upcoming curve section, time needed to regain control of steering is reduced in case of unexpected faulty steering interventions or unexpected loss of automatic steering when traveling through the curve section, as compared to situations where occupants not are aware of the upcoming curve section.

Thus, a vehicle control arrangement is provided which improves safety of travel.

Accordingly, the above mentioned object is achieved.

Optionally, the upcoming road geometry detecting unit further is arranged to detect curvature of the upcoming curve section, and the arrangement further comprises a processing unit configured to determine a reduced velocity on the basis of the curvature, wherein the velocity control arrangement is configured to perform the reduction of the velocity to the determined reduced velocity. Thereby, a vehicle control arrangement is provided which reduces velocity of the road vehicle to a reduced velocity being based on the curvature of the upcoming road section. Thereby, a velocity of the road vehicle through the curve section is obtained which is adapted to the curvature of the curve section. As a result, safety of travel is further improved and unnecessarily low velocities through curve sections having a low degree of curvature are avoided.

Optionally, the vehicle control arrangement further comprises a distance acquiring unit arranged to acquire a distance between the road vehicle and the upcoming curve section, where the velocity control arrangement is configured to initiate the reduction of the velocity of the road vehicle when the distance falls below a first threshold distance. Thereby, a vehicle control arrangement is provided which ensures initiation of reduction of velocity prior to reaching the upcoming curve section. Thereby, a reduced velocity of the road vehicle is ensured when reaching the curve section. Further, a controlled initiation of reduction of velocity is provided. As a result, safety of travel is further improved.

Optionally, the upcoming road geometry detecting unit further is arranged to detect curvature of the upcoming curve section, and where the vehicle control arrangement further comprises a threshold determining unit arranged to determine the first threshold distance at least on the basis of the curvature of the upcoming curve section and a current velocity of the road vehicle. Thereby, the reduction of velocity of the road vehicle is initiated at a distance prior to reaching the upcoming curve section which is based on the curvature of the upcoming curve section. Thereby, safety of travel is further improved since adaptation of velocity of the road vehicle is performed in dependence of the curvature of the upcoming curve section.

Optionally, the vehicle control arrangement further comprises a human machine interface arranged to output to a driver environment of the road vehicle a request to place at least one hand on the steering wheel in case presence of an upcoming curve section is detected and no presence is detected of at least one hand on the steering wheel. Thereby, a vehicle control arrangement is provided with still further improved safety of travel, since the probability is improved that an occupant of the road vehicle will have at least one hand on the steering wheel when reaching the curve section. Still further, safety of travel is further improved since occupants of the road vehicle are notified about the upcoming road section through the outputted request, prior to reaching the upcoming curve section.

Optionally, the human machine interface is arranged to output the request to place at least one hand on the steering wheel when the distance between the road vehicle and the upcoming curve section falls below a second threshold distance. Thereby, a controlled timing of the outputted the request is obtained.

Optionally, the threshold determining unit is arranged to determine the second threshold distance at least on the basis of the curvature of the upcoming curve section and a current velocity of the road vehicle. Thereby, the request is outputted at a distance prior to reaching the upcoming curve section which is based on the curvature of the upcoming curve section. As a result, safety of travel is further improved since it is ensured that the request is outputted sufficiently early prior to reaching the upcoming curve section.

Optionally, the threshold determining unit is arranged to determine the first threshold distance and the second threshold distance such that the second threshold distance is greater than the first threshold distance for given current velocities of the road vehicle and curvatures of the upcoming curve section. Thereby, the request to place at least one hand on the steering wheel is outputted prior to the initiation of the reduction of velocity of the road vehicle. As a result, an occupant of the road vehicle is notified about the upcoming curve section and the impending reduction of velocity, prior to the initiation of the reduction of the velocity. Thus, the occupant is presented with the option of avoiding the reduction of the velocity by placing at least one hand on the steering wheel. Thereby, a more user-friendly vehicle control arrangement is provided since it will not disturb occupants of the road vehicle with unexpected reductions of velocity and since it provides the alternative of avoiding the reduction of the velocity. Further, an increase of travel time to a destination can be avoided.

Optionally, the steering control unit is arranged to restrict steering actuation of the steering actuator in case no presence is detected of at least one hand on the steering wheel. Thereby, unexpected faulty steering interventions by the steering control unit will have a reduced probability of causing an accident. As a result, safety of travel is further improved.

Optionally, the velocity control arrangement is configured to cancel the reduction of velocity of the road vehicle when presence of at least one hand is detected on the steering wheel. Thereby, a more user-friendly vehicle control arrangement is provided since it cancels the reduction of velocity when presence of at least one hand is detected on the steering wheel, i.e. when time needed to regain control of the road vehicle is reduced by the presence of the hand on the steering wheel.

Optionally, the velocity control arrangement is configured to perform an increase in velocity of the road vehicle when presence of at least one hand is detected on the steering wheel. Thereby, a more user-friendly vehicle control arrangement is provided since it increases the velocity of the road vehicle when presence of at least one hand is detected on the steering wheel, i.e. when time needed to regain control of the road vehicle is reduced by the presence of the hand on the steering wheel, thus motivating an increased velocity. According to some embodiments, the velocity control arrangement is configured to, when presence of at least one hand is detected on the steering wheel, perform an increase in velocity of the road vehicle from a reduced velocity to an increased velocity, where the increased velocity corresponds to the velocity of the road vehicle prior to the reduction of velocity, or to a velocity lower than the velocity of the road vehicle prior to the reduction of velocity.

Further embodiments herein aim to provide a road vehicle comprising a vehicle control arrangement according to some embodiments.

Further embodiments herein aim to provide a method of controlling a road vehicle using a vehicle control arrangement comprising a velocity control arrangement, remote sensors, a steering control unit operatively connected to a steering actuator of the road vehicle, an upcoming road geometry detecting unit and a hand-on-wheel detecting unit, wherein the method comprises:

controlling velocity of the road vehicle, using the velocity control arrangement, acquiring vehicle surrounding information, using the remote sensors, controlling steering of the road vehicle based on the vehicle surrounding information by controlling the steering actuator, using the steering control unit, detecting presence of an upcoming curve section of a road on which the road vehicle is traveling, using the upcoming road geometry detecting unit, detecting if presence exists of at least one hand on a steering wheel of the road vehicle, using the hand-on-wheel detecting unit, and performing a reduction of velocity of the road vehicle in case presence of an upcoming curve section is detected and no presence is detected of at least one hand on the steering wheel, using the velocity control arrangement.

Since the method comprises performing a reduction of velocity of the road vehicle in case presence of an upcoming curve section is detected and no presence is detected of at least one hand on the steering wheel, the velocity of the road vehicle will be reduced when arriving at, and traveling through, the curve section if no presence is detected of at least one hand on the steering wheel. As a result of the reduced travel velocity through the curve section unexpected faulty steering interventions by the steering control unit, or unexpected loss of automatic control of steering by the steering control unit, will have a reduced probability of causing an accident. As a result, safety of travel is improved.

Further, a method is provided which provides an incentive for the occupant of the road vehicle to have at least one hand on the steering wheel, or to place at least one hand on the steering wheel, since otherwise the velocity of the road vehicle will be reduced in cases where an upcoming curve section is detected. Also for this reason, safety of travel is improved.

Still further, since the method comprises performing a reduction of velocity of the road vehicle in case presence of an upcoming curve section is detected and no presence is detected of at least one hand on the steering wheel, the reducing of the velocity will notify occupants of the road vehicle about the presence of the upcoming curve section. Also for this reason, safety of travel is improved.

Thus, a method is provided which improves safety of travel.

Accordingly, the above mentioned object is achieved

Optionally, the vehicle control arrangement further comprises a processing unit, and where the method further comprises:

detecting curvature of the upcoming curve section, using the upcoming road geometry detecting unit, determining a reduced velocity on the basis of the curvature, using the processing unit, and performing the reduction of the velocity to the determined reduced velocity, using the velocity control arrangement.

Thereby, a method is provided which reduces velocity of the road vehicle to a reduced velocity being based on the curvature of the upcoming road section. Thereby, a velocity of the road vehicle through the curve section is obtained which is adapted to the curvature of the curve section. As a result, safety of travel is further improved and unnecessarily low velocities through curve sections having a low degree of curvature are avoided.

Optionally, the vehicle control arrangement further comprises a distance acquiring unit, and where the method further comprises:

acquiring a distance between the road vehicle and the upcoming curve section, using the distance acquiring unit, and initiating the reduction of the velocity of the road vehicle when the distance falls below a first threshold distance, using the velocity control arrangement.

Thereby, a method is provided which ensures initiation of reduction of velocity of the road vehicle prior to reaching the upcoming curve section. Thereby, a reduced velocity of the road vehicle is ensured when reaching the curve section. Further, a method is provided which initiates reduction of velocity in a controlled manner. As a result, safety of travel is further improved.

Optionally, the vehicle control arrangement further comprises a threshold determining unit, and the method may further comprise:

detecting curvature of the upcoming curve section, using the upcoming road geometry detecting unit, determining the first threshold distance at least on the basis of the curvature of the upcoming curve section and a current velocity of the road vehicle, using the threshold determining unit.

Thereby, the reduction of velocity of the road vehicle is initiated at a distance prior to reaching the upcoming curve section which is based on the curvature of the upcoming curve section. Thereby, safety of travel is further improved since adaptation of velocity of the road vehicle is performed in dependence of the curvature of the upcoming curve section.

Optionally, the vehicle control arrangement further comprises a human machine interface, and where the method further comprises:

outputting to a driver environment of the road vehicle a request to place at least one hand on the steering wheel in case presence of an upcoming curve section is detected and no presence is detected of at least one hand on the steering wheel, using said human machine interface.

Thereby, a method is provided which still further improves safety of travel, since the probability is improved that an occupant of the road vehicle will have at least one hand on the steering wheel when reaching the curve section. Even further, safety of travel is further improved since occupants of the road vehicle are notified about the upcoming road section through the outputted request prior to reaching the upcoming curve section.

Optionally, the method further comprises:

outputting to a driver environment of the road vehicle a request to place at least one hand on the steering wheel when the distance between the road vehicle and the upcoming curve section falls below a second threshold distance.

Thereby, a controlled timing of the outputting of the request is obtained.

Optionally, the method further comprises:

determining the second threshold distance at least on the basis of the curvature of the upcoming curve section and a current velocity of the road vehicle, using the threshold determining unit.

Thereby, the request is outputted at a distance prior to reaching the upcoming curve section which is based on the curvature of the upcoming curve section. As a result, safety of travel is further improved since the outputting of the request is performed in dependence of the curvature of the upcoming curve section.

Optionally, the method further comprises:

determining the first threshold distance and the second threshold distance such that the second threshold distance is greater than the first threshold distance for given current velocities of the road vehicle and curvatures of the upcoming curve section, using the threshold determining unit.

Thereby, the request to place at least one hand on the steering wheel is outputted prior to the initiation of the reduction of velocity of the road vehicle. As a result, an occupant of the road vehicle is notified about the upcoming curve section and the impending reduction of velocity prior to the initiation of the reduction of the velocity. Thus, the occupant is presented with the option of avoiding the reduction of the velocity by placing at least one hand on the steering wheel. Thereby, a method is provided that will not distract occupants of the road vehicle with unexpected reductions of velocity since it provides the alternative of avoiding the reduction of the velocity. Further, an increase in travel time to a destination can be avoided.

Optionally, the method further comprises:

restricting steering actuation of said steering actuator in case no presence is detected of at least one hand on said steering wheel, using said steering control unit.

Thereby, a method is provided in which unexpected faulty steering interventions by the steering control unit will have a reduced probability of causing an accident. As a result, safety of travel is further improved.

Optionally, the method further comprises:

cancelling the reduction of the velocity of the road vehicle when at least one hand is detected on the steering wheel, using the velocity control arrangement.

Thereby, an occupant of the road vehicle may cancel the reduction of velocity by placing at least one hand on the steering wheel. As a result, a more user-friendly method is provided.

Optionally, the method further comprises:

performing an increase in velocity of the road vehicle when at least one hand is detected on the steering wheel, using the velocity control arrangement.

Thereby, more user-friendly method is provided since it performs an increase of velocity of the road vehicle when presence of at least one hand is detected on the steering wheel, i.e. when time needed for regaining control of the road vehicle is reduced by the presence of the hand on the steering wheel, thus motivating an increased velocity. According to some embodiments, the method comprises performing an increase in velocity of the road vehicle, when presence of at least one hand is detected on the steering wheel, from a reduced velocity to an increased velocity, where the increased velocity corresponds to the velocity of the road vehicle prior to the initial reduction of velocity to the reduced velocity, or to a velocity lower than the velocity of the road vehicle prior to the initial reduction of velocity.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various embodiments of the disclosure, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Well-known functions or constructions will not necessarily be described in detail for brevity and/or clarity.

Figure 1:
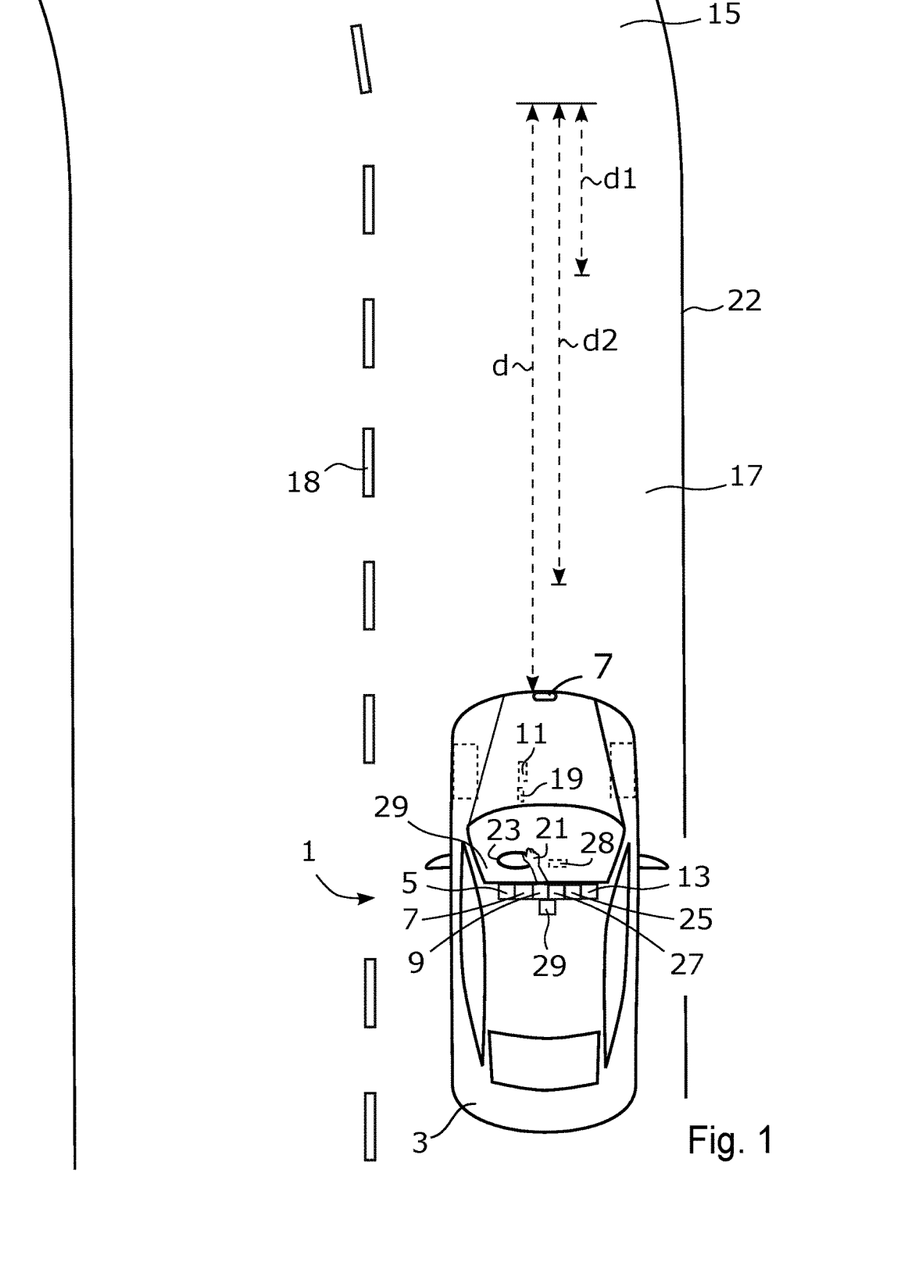
FIG. 1 illustrates a road vehicle comprising a vehicle control arrangement, according to some embodiments.

FIG. 1 illustrates road vehicle 3 comprising a vehicle control arrangement 1 according to some embodiments. The road vehicle 3 may be a car, as is illustrated in FIG. 1, or may be another type of road vehicle such as a bus, truck, van or similar. The vehicle control arrangement 1 comprises a velocity control arrangement 5 configured to control velocity of the road vehicle 3 and remote sensors 7 arranged to acquire vehicle surrounding information. The vehicle control arrangement 1 further comprises a steering control unit 9 operatively connected to a steering actuator 11 of the road vehicle 3 and being arranged to control steering of the road vehicle 3 based on the vehicle surrounding information by controlling the steering actuator 11. The control of steering of the road vehicle 3 by the steering actuator 11 may be referred to as an automatic control of steering, since it is performed based on the vehicle surrounding information acquired by the remote sensors 7. According to some embodiments, the control of steering of the road vehicle 3 by the steering actuator 11 is an autonomous control of steering, as further explained below.

The remote sensors 7 may comprise one or more sensors such as RADAR (RAdio Detection And Ranging) sensors or LASER (Light Amplification by Stimulated Emission of Radiation) sensors, or LIDAR (Light Detection And Ranging) sensors, or one or more imaging sensors, such as one or more camera units. The remote sensors 7 may be arranged in a front section of the road vehicle 3 and/or in a region of a rear view mirror of the road vehicle, as is illustrated in FIG. 1, and/or in another position at the road vehicle 3 suitable for acquiring vehicle surrounding information. In addition to the above described sensors, the remote sensors 7 may comprise map data covering at least the road 17 on which the road vehicle 3 is traveling and a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System and/or other means to position the road vehicle 3 within the map, such as feature based localization based on the remote sensors 7. As an alternative, or in addition, the remote sensors 7 may comprise a wireless communication unit configured to acquire vehicle surrounding information from other vehicles and/or from a remote database arranged in a cloud or a remote server or similar.

The vehicle surrounding information acquired by the remote sensors 7 may comprise the extension of the road 17 on which the vehicle 3 is traveling, presence and position of road boundaries 22 of the road 17, presence and position of painted objects on the road 17, such as lane markings 18, and presence and positions of objects, such as other vehicles on the road 17, as well as road side objects.

According to some embodiments, the steering control unit 9 forms part of a lane-keeping system configured to automatically control steering of the road vehicle 3 based on position of lane markings 18 and/or road boundaries 22 of the road 17 on which the vehicle 3 is traveling.

According to further embodiments, the steering control unit 9 forms part of an autonomous steering control system configured to autonomously control steering of the road vehicle 3. Such autonomous control of steering may be based on the extension of the road 17 on which the vehicle 3 is traveling and presence and position of objects, such as other vehicles on the road 17, in addition to positions of lane markings 18 and road boundaries 22 of the road 17 on which the vehicle 3 is traveling.

The velocity control arrangement 5 may be configured to control velocity of the road vehicle 3 by controlling a propulsion unit of the road vehicle 3 and/or brakes of the road vehicle 3.

According to some embodiments, the velocity control arrangement 5 forms part of a cruise control arrangement configured to keep a set velocity. According to further embodiments, the velocity control arrangement 5 forms part of an adaptive cruise control arrangement configured to keep a set velocity as well as configured to keep a certain distance to a preceding vehicle. Such a preceding vehicle is not illustrated in FIG. 1.

According to still further embodiments, the velocity control arrangement 5 forms part of an autonomous velocity control arrangement configured to autonomously control velocity of the road vehicle 3 on the basis of the vehicle surrounding information acquired by the remote sensors 7.

The vehicle control arrangement 1 further comprises an upcoming road geometry detecting unit 13 arranged to detect presence of an upcoming curve section 15 of a road 17 on which the road vehicle 3 is traveling. The upcoming road geometry detecting unit 13 may comprise a space based satellite positioning system such as a Global Positioning System (GPS), The Russian GLObal NAvigation Satellite System (GLONASS), European Union Galileo positioning system, Chinese Compass navigation system, or Indian Regional Navigational Satellite System and map data covering at least the road 17 on which the road vehicle 3 is travelling. The upcoming road geometry detecting unit 13 may detect presence of an upcoming curve section 15 by comparing map data and a current position of the road vehicle 3 obtained by a positioning system, such as a GPS and/or other means to obtain the current position the road vehicle 3, such as feature based localization. As an alternative, or in addition, the upcoming road geometry detecting unit 13 may comprise one or more sensors such as RADAR (RAdio Detection And Ranging) sensors or LASER (Light Amplification by Stimulated Emission of Radiation) sensors, or LIDAR (Light Detection And Ranging) sensors, or one or more imaging sensors, such as one or more camera units. As an alternative, or in addition, the upcoming road geometry detecting unit 13 may comprise a wireless communication unit configured to acquire information representative of upcoming curve sections 15 of the road 17 on which the road vehicle 3 is traveling from other vehicles and/or from a remote database arranged in a cloud or a remote server or similar.

The vehicle control arrangement 1 further comprises a hands-on-wheel detecting unit 19 configured to detect if presence exists of at least one hand 21 on a steering wheel 23 of the road vehicle 3. The hands-on-wheel detecting unit 19 may comprise a torque sensor, as is illustrated in FIG. 1, arranged to detect presence of at least one hand 21 on a steering wheel 23 by monitoring torque applied onto the steering wheel 23. As an alternative, or in addition, the hands-on-wheel detecting unit 19 may comprise one or more imaging sensors, such as one or more camera units covering an area of the steering wheel and an image analysis unit arranged to analyze images captured by the one or more imaging sensors to detect presence of at least one hand 21 on the steering wheel 23. As an alternative, or in addition, the hands-on-wheel detecting unit 19 may comprise one or more contact sensors, such as one or more inductive sensors, configured to detect if presence exists of at least one hand 21 on the steering wheel 23 by detecting contact between at least one hand 21 and the steering wheel 23. As an alternative, or in addition, the hands-on-wheel detecting unit 19 may comprise one or more proximity sensors configured to detect if presence exists of at least one hand 21 on the steering wheel 23, for example one or more proximity sensors emitting an electromagnetic field or beam of electromagnetic radiation, such as infrared light.

The velocity control arrangement 5 is configured to perform a reduction of velocity of the road vehicle 3 in case presence of an upcoming curve section 15 is detected and no presence of at least one hand 21 on the steering wheel 23 is detected. Thereby, travel safety is improved for several reasons. One such reason is that an occupant of the vehicle 3, or the vehicle control arrangement 1, will have more time available to regain control of the vehicle 3 in case such unexpected faulty steering interventions or unexpected loss of automatic steering occurs when traveling through the curve section 17.

According to some embodiments, the upcoming road geometry detecting unit 13 is further arranged to detect curvature of the upcoming curve section 15. The detected curvature may encompass a degree of curvature representative of a radius of curvature and/or a rate of change of the radius of curvature. The detected curvature may also encompass presence of several consecutive curves, which may have shifting directions of curvature as well as shifting degree of curvatures. The upcoming road geometry detecting unit 13 may detect curvature of the upcoming curve section 15 by comparing map data and a current position of the road vehicle 3 obtained by a positioning system, such as a GPS and/or by analyzing vehicle surrounding data acquired by the remote sensors 7.

The vehicle control arrangement 1 may further comprise a processing unit 25 configured to determine a reduced velocity on the basis of the curvature wherein the velocity control arrangement 5 is configured to perform the reduction of the velocity to the determined reduced velocity. The processing unit 25 may be configured to determine the reduced velocity on the basis of the curvature such that the reduced velocity is determined to a lower velocity in cases of higher degree of curvatures and to a higher reduced velocity in cases of lower degree of curvatures of upcoming curve sections 15. Thereby, a velocity of the road vehicle 3 through the curve section 15 is obtained which is adapted to the curvature of the curve section 15.

According to some embodiments, the velocity control arrangement 5 is configured to only perform the reduction of the velocity in cases where a degree of curvature of an upcoming curve section 15 exceeds a degree of curvature threshold value. Thereby, a vehicle control arrangement 1 is provided which only performs a reduction of the velocity of the road vehicle 3 in case of presence of an upcoming curve section 15 is detected having a degree of curvature, exceeding a degree of curvature threshold value, and no presence is detected of at least one hand 21 on the steering wheel 23. As a result, the vehicle control arrangement 1 will not disturb occupants with unexpected and unjustifiable reductions of velocity, and will not increase travel time to a destination by performing reductions of velocity in cases of upcoming curve sections 15 having a degree of curvature being below the degree of curvature threshold value.

The above may also be embodied such that the velocity control arrangement 5 is configured to only perform the reduction of the velocity in cases where a radius of curvature of an upcoming curve section 15 exceeds a radius of curvature threshold value.

According to some embodiments, the vehicle control arrangement 1 further comprises a distance acquiring unit 27 arranged to acquire a distance d between the road vehicle 3 and the upcoming curve section 15, where the velocity control arrangement 5 is configured to initiate the reduction of the velocity of the road vehicle 3 when the distance d falls below a first threshold distance d1. Thereby, initiation of the reduction of velocity is provided at a distance from the upcoming curve section.

The vehicle control arrangement 1 may further comprise a human machine interface 28 arranged to output to a driver environment 29 of the road vehicle 3 a request to place at least one hand 21 on the steering wheel 23 in case presence of an upcoming curve section is detected, and no presence is detected of at least one hand on the steering wheel. This provides a significantly improved probability that an occupant of the road vehicle will have at least one hand on the steering wheel, when the road vehicle 3 reaches the curve section. In addition, occupants of the road vehicle 3 will be notified about the upcoming curve section 15 by the outputting of the request.

According to some embodiments, the human machine interface 28 is arranged to output the request to place at least one hand 21 on the steering wheel 23, when the distance d between the road vehicle 3 and the upcoming curve section 15 falls below a second threshold distance d2. Thereby, the request is outputted in a controlled manner.

The human machine interface 28 may comprise a display arrangement, as is illustrated in FIG. 1. As an alternative, or in addition, the human machine interface 28 may comprise an audio arrangement and/or a haptic arrangement. The request outputted to the driver environment 29 may comprise the distance remaining to the upcoming curve section 15, i.e. the distance d between the road vehicle 3 and the upcoming curve section 15. As an alternative, or in addition, the request outputted to the driver environment 29 may comprise an estimated time of arrival to the upcoming curve section 15.

According to some embodiments, the vehicle control arrangement 1 comprises a threshold determining unit 29 arranged to determine the first threshold distance d1 and/or the second threshold distance d2 at least on the basis of the curvature of the upcoming curve section 15 and a current velocity of the road vehicle 3. The threshold determining unit 29 may determine the first threshold distance d1 to a greater distance in cases of higher current velocities of the road vehicle 3, than in cases of lower current velocities of the road vehicle 3. Thereby, it is ensured that the initiation of the reduction of the velocity of the road vehicle 3 is performed sufficiently early to assume a reduced velocity of the road vehicle 3, when reaching the upcoming curve section 15. The threshold determining unit 29 may determine the first threshold distance d1 to a greater distance in cases of smaller radiuses of curvature of curves of the upcoming curve section 15 than in cases of greater radiuses of curvature of curves of the upcoming curve section 15. Thereby, it is ensured that the road vehicle 3 assumes a sufficiently low velocity prior to reaching an upcoming curve section with curves having small radiuses of curvature, and it is ensured that the road vehicle 3 does not assume unjustifiably low velocities prior to reaching upcoming curve sections with curves having greater radiuses of curvature.

The threshold determining unit 29 may determine the second threshold distance d2 to a greater distance in cases of higher current velocity of the road vehicle 3, than in cases of lower current velocity of the road vehicle 3. Thereby, it is ensured that the request to place at least one hand 21 on the steering wheel 23 is outputted sufficiently early prior to reaching the upcoming curve section 15, to enable an occupant of the road vehicle 3 to finish off other activities and place at least one hand 21 on the steering wheel 23. Also, it is ensured that occupants of the road vehicle 3 are notified sufficiently early about the upcoming curve section 15. Further, the threshold determining unit 29 may determine the second threshold distance d2 to a greater distance in cases of smaller radiuses of curvature of curves of the upcoming curve section 15, than in cases of greater radiuses of curvature of curves of the upcoming curve section 15. Thereby, the request to place at least one hand 21 on the steering wheel 23 is outputted earlier in cases of upcoming road sections 15 having curves with smaller radiuses of curvature. Accordingly, the request to place at least one hand 21 on the steering wheel 23 is outputted earlier in cases where it is more important for the occupant to place at least one hand 21 on the steering wheel 23. As a result, safety of travel is further improved.

The human machine interface 28 may be arranged to output the request to place at least one hand 21 on the steering wheel 23 only in case presence of an upcoming curve section 15 is detected having a degree of curvature exceeding a degree of curvature threshold value and no presence is detected of at least one hand 21 on the steering wheel 23.

As is illustrated in FIG. 1, the threshold determining unit 29 may be arranged to determine the first threshold distance d1 and the second threshold distance d2 such that the second threshold distance d2 is greater than the first threshold distance d1, for given current velocities of the road vehicle 3, and curvatures of the upcoming curve section 15. Thereby, it is ensured that the request to place at least one hand 21 on the steering wheel 23 is outputted prior to the initiation of the reduction of the velocity of the road vehicle 3. As a result, occupants of the road vehicle 3 are given the option to place at least one hand 21 on the steering wheel 23, so as to avoid a reduction of velocity.

According to some embodiments, the steering control unit 9 is arranged to restrict steering actuation of the steering actuator 11 in case no presence is detected of at least one hand 21 on the steering wheel 23. The steering control unit 9 may restrict steering actuation of the steering actuator 11 by restricting a maximum steering actuation of the steering actuator 11. That is, the steering control unit 9 may lower the maximum steering actuation of the steering actuator 11 in case no presence is detected of at least one hand 21 on the steering wheel 23. Steering actuation of the steering actuator 11 may encompass a steering torque, a steering speed, a steering force of the steering actuator 11 applied onto a rack, a displacement of the rack, and/or a rate of change of the displacement of the rack. By restricting steering actuation of the steering actuator 11, in case no presence is detected of at least one hand 21 on the steering wheel 23, safety of travel is further improved since unexpected faulty steering interventions by the steering control unit 9 will have a reduced probability of causing an accident. In addition, in case presence is detected of at least one hand 21 on the steering wheel 23, a higher degree of steering actuation of the steering actuator 11 can be allowed.

According to some embodiments, the steering control unit 9 is arranged to restrict steering actuation of the steering actuator 11 in dependence of the curvature of the upcoming curve section 15. In such embodiments, the steering control unit 9 may apply a less extensive restriction of the steering actuation of the steering actuator 11 in case of a high degree of curvature of an upcoming curve section 15, than in case of a low degree of curvature of an upcoming curve section 15. Thereby, a sufficient steering torque can be ensured when traveling through curve sections 15 having high degree of curvature.

According to some embodiments, the velocity control arrangement 5 is configured to cancel the reduction of velocity of the road vehicle 3 when presence of at least one hand 21 is detected on the steering wheel 23. Thereby, a vehicle control arrangement 1 is provided which cancels the reduction of velocity, after the initiation of reduction of velocity, if an occupant places at least one hand 21 on the steering wheel 23. Thereby, occupants of the road vehicle 3 are given the option of cancelling the reduction of velocity of the road vehicle 3 by placing at least one hand 21 on the steering wheel 23. In addition, occupants of the road vehicle 3 are given the option of allowing a higher degree of steering actuation of the steering actuator 11, by the steering control unit 9, by placing at least one hand 21 on the steering wheel 23.

According to some embodiments, the velocity control arrangement 5 is configured to perform an increase in velocity of the road vehicle 3 when presence of at least one hand 21 is detected on the steering wheel 23. Thereby, a vehicle control arrangement 1 is provided which increases the velocity of the road vehicle 3, after the initiation of reduction of velocity, if an occupant places at least one hand 21 on the steering wheel 23. Thereby, occupants of the road vehicle 3 are given the option to increase velocity of the road vehicle 3, by placing at least one hand 21 on the steering wheel 23. The increase in velocity may encompass an increase in velocity from a reduced velocity to an increased velocity corresponding to an initial velocity of the road vehicle prior to the reduction of velocity, or corresponding to a velocity lower than the initial velocity of the road vehicle.

As specified above, the velocity control arrangement 5 may form part of an autonomous velocity control arrangement 5 configured to autonomously control velocity of the road vehicle 3, on the basis of the vehicle surrounding information acquired by the remote sensors 7. In such embodiments, the velocity control arrangement 5 may reduce velocity of the road vehicle 3 even if presence of at least one hand 21 is detected on the steering wheel 23 and an upcoming curve section 15 is detected. However, according to these embodiments, i.e. in embodiments where the velocity control arrangement 5 forms part of an autonomous velocity control arrangement, the velocity control arrangement 5 is configured to perform a reduction of velocity of the road vehicle 3 to a lower velocity in case presence of an upcoming curve section 15 is detected, and no presence is detected of at least one hand 21 on the steering wheel 23, than in cases where presence is detected of at least one hand 21 on the steering wheel 23.

Similarly, in embodiments where the velocity control arrangement 5 forms part of an adaptive cruise control arrangement configured to keep a set velocity, as well as configured to keep a certain distance to a preceding vehicle, the velocity control arrangement 5 may reduce velocity of the road vehicle 3 even if presence of at least one hand 21 is detected on the steering wheel 23, and an upcoming curve section 15 is detected. However, according to these embodiments, i.e. in embodiments where the velocity control arrangement 5 forms part of an adaptive cruise control arrangement, the velocity control arrangement 5 is configured to perform a reduction of velocity of the road vehicle 3 to a lower velocity in case presence of an upcoming curve section 15 is detected and no presence is detected of at least one hand 21 on the steering wheel 23, than in cases where presence is detected of at least one hand 21 on the steering wheel 23.

Figure 2:
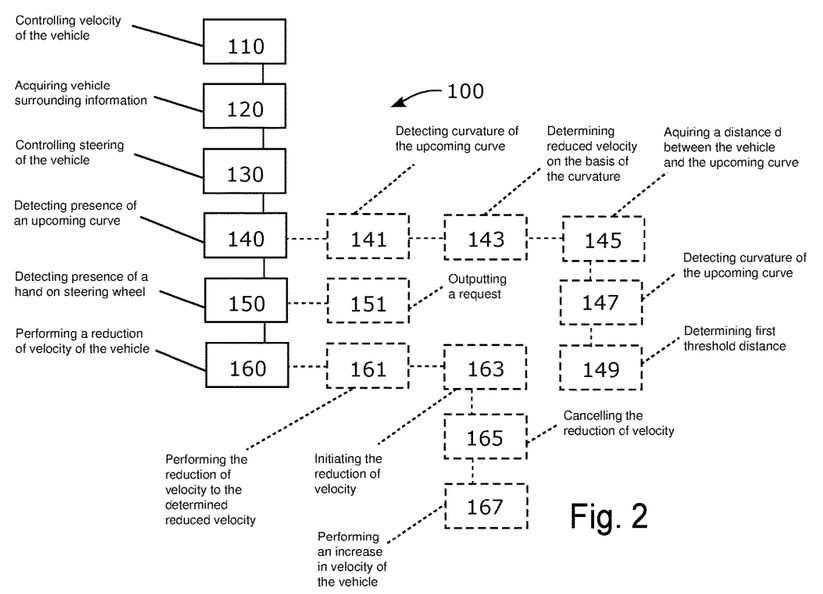
FIG. 2 illustrates a method of controlling a road vehicle, according to some embodiments.

FIG. 2 illustrates a method 100 of controlling a road vehicle using a vehicle control arrangement comprising a velocity control arrangement, remote sensors, a steering control unit operatively connected to a steering actuator of the road vehicle, an upcoming road geometry detecting unit and a hand-on-wheel detecting unit, wherein the method 100 comprises:

controlling 110 velocity of the road vehicle, using the velocity control arrangement, acquiring 120 vehicle surrounding information, using the remote sensors, controlling 130 steering of the road vehicle based on the vehicle surrounding information by controlling the steering actuator, using the steering control unit, detecting 140 presence of an upcoming curve section of a road on which the road vehicle is traveling, using the upcoming road geometry detecting unit, detecting 150 presence of at least one hand on a steering wheel of the road vehicle, using the hand-on-wheel detecting unit, and performing 160 a reduction of velocity of the road vehicle in case presence of an upcoming curve section is detected and no presence is detected of at least one hand on the steering wheel, using the velocity control arrangement.

Optionally, the vehicle control arrangement further comprises a processing unit, and as illustrated in FIG. 2, the method 100 may further comprise:

detecting 141 curvature of the upcoming curve section, using the upcoming road geometry detecting unit, determining 143 a reduced velocity on the basis of the curvature, using the processing unit, and performing 161 the reduction of the velocity to the determined reduced velocity, using the velocity control arrangement.

Optionally, the vehicle control arrangement further comprises a distance acquiring unit, and as illustrated in FIG. 2, the method 100 may further comprise:

acquiring 145 a distance d between the road vehicle and the upcoming curve section, using the distance acquiring unit, and initiating 163 the reduction of the velocity of the road vehicle when the distance falls below a first threshold distance, using the velocity control arrangement.

Optionally, the vehicle control arrangement further comprises a threshold determining unit, and where the method 100 further comprises:

detecting 147 curvature of the upcoming curve section, using the upcoming road geometry detecting unit, and determining 149 the first threshold distance at least on the basis of the curvature of the upcoming curve section and a current velocity of the road vehicle, using the threshold determining unit.

Optionally, the vehicle control arrangement further comprises a human machine interface, and the method 100 may further comprise:

outputting 151 to a driver environment of the road vehicle a request to place at least one hand on the steering wheel in case presence of an upcoming curve section is detected and no presence is detected of at least one hand on the steering wheel, using the human machine interface.

Optionally, the method 100 further comprises:

restricting steering actuation of said steering actuator in case no presence is detected of at least one hand on said steering wheel, using said steering control unit.

Optionally, the method 100 further comprises:

cancelling 165 the reduction of the velocity of the road vehicle when at least one hand is detected on the steering wheel, using the velocity control arrangement.

Optionally, the method 100 further comprises:

performing 167 an increase in velocity of the road vehicle when at least one hand is detected on the steering wheel, using the velocity control arrangement.

Optionally, the method 10 comprises:

performing an increase in velocity of the road vehicle, when presence of at least one hand is detected on the steering wheel, from a reduced velocity to an increased velocity, where the increased velocity corresponds to the velocity of the road vehicle prior to the initial reduction of velocity to the reduced velocity, or where the increased velocity corresponds to the velocity of the road vehicle prior to the initial reduction of velocity to the reduced velocity.

Those skilled in the art will appreciate that the vehicle control arrangement 1, vehicle 3, velocity control arrangement 5, remote sensors 7, steering control unit 9, steering actuator 11, upcoming road geometry detecting unit 13, hands-on-wheel detecting unit 19, processing unit 25, distance acquiring unit 27, human machine interface 28, threshold determining unit 29, lane keeping system, autonomous steering control system, cruise control arrangement, adaptive cruise control arrangement, autonomous vehicle control arrangement, positioning system, display arrangement, audio arrangement, haptic arrangement, and/or any other arrangement, unit, system, device or module described herein may comprise, in whole or in part, a combination of analog and digital circuits and/or one or more appropriately programmed processors (e.g., one or more microprocessors including central processing units (CPU)) and associated memory, which may include stored operating system software, firmware and/or application software executable by the processor(s) for controlling operation thereof and/or for performing the particular algorithms represented by the various functions and/or operations described herein, including interaction between and/or cooperation with each other. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

Furthermore, the vehicle control arrangement 1, vehicle 3, velocity control arrangement 5, remote sensors 7, steering control unit 9, steering actuator 11, upcoming road geometry detecting unit 13, hands-on-wheel detecting unit 19, processing unit 25, distance acquiring unit 27, human machine interface 28, threshold determining unit 29, lane keeping system, autonomous steering control system, cruise control arrangement, adaptive cruise control arrangement, autonomous vehicle control arrangement, positioning system, display arrangement, audio arrangement, haptic arrangement, and/or any other arrangement, unit, system, device or module described herein may for instance be implemented in one or several arbitrary nodes comprised in the host vehicle. In that regard, such a node may comprise an electronic control unit (ECU) or any suitable electronic device, which may be a main or central node. It should also be noted that the vehicle control arrangement 1, vehicle 3, velocity control arrangement 5, remote sensors 7, steering control unit 9, steering actuator 11, upcoming road geometry detecting unit 13, hands-on-wheel detecting unit 19, processing unit 25, distance acquiring unit 27, human machine interface 28, threshold determining unit 29, lane keeping system, autonomous steering control system, cruise control arrangement, adaptive cruise control arrangement, autonomous vehicle control arrangement, positioning system, display arrangement, audio arrangement, haptic arrangement, and/or any other arrangement, unit, system, device or module described herein may further comprise or be arranged or configured to cooperate with any type of storage device or storage arrangement known in the art, which may for example be used for storing input or output data associated with the functions and/or operations described herein. The vehicle control arrangement 1, vehicle 3, velocity control arrangement 5, remote sensors 7, steering control unit 9, steering actuator 11, upcoming road geometry detecting unit 13, hands-on-wheel detecting unit 19, processing unit 25, distance acquiring unit 27, human machine interface 28, threshold determining unit 29, lane keeping system, autonomous steering control system, cruise control arrangement, adaptive cruise control arrangement, autonomous vehicle control arrangement, positioning system, display arrangement, audio arrangement, haptic arrangement, and/or any other arrangement, unit, system, device or module described herein may further comprise any computer hardware and software and/or electrical hardware known in the art configured to enable communication therebetween.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A vehicle control arrangement configured to control steering and velocity of a road vehicle, the arrangement comprising:
    a velocity control arrangement configured to control velocity of the road vehicle;
    remote sensors configured to acquire vehicle surrounding information;
    a steering control unit operatively connectable to a steering actuator of the road vehicle and configured to control steering of the road vehicle based on the vehicle surrounding information by controlling the steering actuator;
    an upcoming road geometry detecting unit configured to detect presence of an upcoming curve section of a road on which the road vehicle is traveling;
    a hands-on-wheel detecting unit configured to detect if presence exists of at least one hand on a steering wheel of the road vehicle,
    wherein the velocity control arrangement further is configured to perform a reduction of velocity of the road vehicle in case presence of an upcoming curve section is detected and no presence is detected of at least one hand on the steering wheel, and wherein the vehicle control arrangement controls vehicle steering and velocity as the vehicle traverses the curve section.

2. The arrangement according to claim 1 wherein the upcoming road geometry detecting unit further is arranged to detect curvature of the upcoming curve section, and where the arrangement further comprises a processing unit configured to determine a reduced velocity on the basis of the curvature, wherein the velocity control arrangement is configured to perform the reduction of the velocity to the determined reduced velocity.

3. The arrangement according to claim 1 further comprising a distance acquiring unit arranged to acquire a distance between the road vehicle and the upcoming curve section, where the velocity control arrangement is configured to initiate the reduction of velocity of the road vehicle when the distance falls below a first threshold distance.

4. The arrangement according to claim 3 wherein the upcoming road geometry detecting unit further is arranged to detect curvature of the upcoming curve section, and where the arrangement further comprises a threshold determining unit arranged to determine the first threshold distance at least on the basis of the curvature of the upcoming curve section and a current velocity of the road vehicle.

5. The arrangement according to claim 1 further comprising a human machine interface arranged to output to a driver environment of the road vehicle a request to place at least one hand on the steering wheel in case presence of an upcoming curve section is detected and no presence is detected of at least one hand on the steering wheel.

6. The arrangement according to claim 1 wherein the steering control unit is arranged to restrict steering actuation of the steering actuator in case no presence is detected of at least one hand on the steering wheel.

7. The arrangement according to claim 1 wherein the velocity control arrangement is configured to cancel the reduction of velocity of the road vehicle when presence of at least one hand is detected on the steering wheel.

8. The arrangement according to claim 1 wherein the velocity control arrangement is configured to perform an increase in velocity of the road vehicle when presence of at least one hand is detected on the steering wheel.

9. A road vehicle comprising a vehicle control arrangement according to claim 1.

10. A method of controlling a road vehicle using a vehicle control arrangement comprising a velocity control arrangement, remote sensors, a steering control unit operatively connected to a steering actuator of the road vehicle, an upcoming road geometry detecting unit and a hand-on-wheel detecting unit, the method comprising:
    controlling velocity of the road vehicle, using the velocity control arrangement;
    acquiring vehicle surrounding information, using the remote sensors;
    controlling steering of the road vehicle based on the vehicle surrounding information by controlling the steering actuator, using the steering control unit;
    detecting presence of an upcoming curve section of a road on which the road vehicle is traveling, using the upcoming road geometry detecting unit;
    detecting if presence exists of at least one hand on a steering wheel of the road vehicle, using the hand-on-wheel detecting unit; and
    performing a reduction of velocity of the road vehicle in case presence of an upcoming curve section is detected and no presence is detected of at least one hand on the steering wheel, using the velocity control arrangement, wherein the vehicle control arrangement controls vehicle steering and velocity as the vehicle traverses the curve section.

11. The method according to claim 10 wherein the vehicle control arrangement further comprises a processing unit, and wherein the method further comprises:
    detecting curvature of the upcoming curve section, using the upcoming road geometry detecting unit,
    determining a reduced velocity on the basis of the curvature, using the processing unit, and
    performing the reduction of the velocity to the determined reduced velocity, using the velocity control arrangement.

12. The method according to claim 10 wherein the vehicle control arrangement further comprises a distance acquiring unit, and where the method further comprises:
    acquiring a distance between the road vehicle and the upcoming curve section, using the distance acquiring unit, and
    initiating the reduction of velocity of the road vehicle when the distance (d) falls below a first threshold distance, using the velocity control arrangement.

13. The method according to claim 12 wherein the vehicle control arrangement further comprises a threshold determining unit, and where the method further comprises:
    detecting curvature of the upcoming curve section, using the upcoming road geometry detecting unit, and
    determining the first threshold distance at least on the basis of the curvature of the upcoming curve section and a current velocity of the road vehicle, using the threshold determining unit.

14. The method according to claim 10 wherein the vehicle control arrangement further comprises a human machine interface, and where the method further comprises:
    outputting to a driver environment of the road vehicle a request to place at least one hand on the steering wheel in case presence of an upcoming curve section is detected and no presence is detected of at least one hand on the steering wheel, using the human machine interface.

15. The method according to claim 10 further comprising:
cancelling the reduction of the velocity of the road vehicle when at least one hand is detected on the steering wheel, using the velocity control arrangement.

16. A method of controlling a road vehicle using a vehicle control arrangement, the method comprising:
controlling velocity of the road vehicle, using a velocity control arrangement of the vehicle control arrangement;
acquiring vehicle surrounding information, using remote sensors of the vehicle control arrangement;
controlling steering of the road vehicle based on the vehicle surrounding information by controlling a steering actuator of the road vehicle, using a steering control unit of the vehicle control arrangement;
detecting presence of an upcoming curve section of a road on which the road vehicle is traveling, using an upcoming road geometry detecting unit of the vehicle control arrangement;
detecting if presence exists of at least one hand on a steering wheel of the road vehicle, using a hand-on-wheel detecting unit of the vehicle control arrangement; and
performing a reduction of velocity of the road vehicle in case presence of an upcoming curve section is detected and no presence is detected of at least one hand on the steering wheel, using the velocity control arrangement, wherein the vehicle control arrangement controls vehicle steering and velocity as the vehicle traverses the curve section.

* * * * *